(12) United States Patent  (10) Patent No.: US 9,387,844 B2
White  (45) Date of Patent: Jul. 12, 2016

(54) ENVIRONMENT-BASED ANTI-LOCK BRAKING SYSTEM

(71) Applicant: Toyota Motor Engineering & Manufacturing North America, Inc., Erlanger, KY (US)

(72) Inventor: Chelsea R. White, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/552,125

(22) Filed: Nov. 24, 2014

(65) Prior Publication Data

US 2016/0144841 A1  May 26, 2016

(51) Int. Cl.
*G06F 19/00* (2011.01)
*B60T 8/1763* (2006.01)
*B60T 8/171* (2006.01)
*B60T 8/1761* (2006.01)

(52) U.S. Cl.
CPC ............. *B60T 8/17636* (2013.01); *B60T 8/171* (2013.01); *B60T 8/17616* (2013.01)

(58) Field of Classification Search
CPC .. B60T 8/17636; B60T 8/171; B60T 8/17616
USPC .......................................................... 701/70
See application file for complete search history.

(56) References Cited

U.S. PATENT DOCUMENTS

| | | | | |
|---|---|---|---|---|
| 4,916,619 A * | 4/1990 | Walenty | .............. | B60T 8/17636 303/150 |
| 5,480,221 A | 1/1996 | Morita et al. | | |
| 5,646,849 A * | 7/1997 | Walenty | ................ | B60T 8/1764 303/155 |
| 6,272,417 B1 * | 8/2001 | Ross | ..................... | B60T 8/1764 303/121 |
| 6,505,110 B1 * | 1/2003 | Yoshino | .............. | B60T 8/17616 701/71 |
| 7,486,175 B2 * | 2/2009 | Suzuki | .................. | B60W 50/14 340/435 |
| 8,098,171 B1 | 1/2012 | Szczerba et al. | | |
| 8,686,872 B2 | 4/2014 | Szczerba et al. | | |
| 8,706,378 B2 * | 4/2014 | Choby | .................... | B60T 8/172 180/197 |
| 2005/0162012 A1 * | 7/2005 | Sakai | ........................ | B60T 8/56 303/191 |
| 2006/0060441 A1 * | 3/2006 | Sakai | ...................... | B60B 39/02 191/2 |
| 2010/0106356 A1 | 4/2010 | Trepagnier et al. | | |
| 2014/0081507 A1 | 3/2014 | Urmson et al. | | |
| 2014/0229086 A1 * | 8/2014 | Udaka | ....................... | B60T 7/22 701/75 |
| 2015/0301338 A1 * | 10/2015 | Van Heugten | .......... | G02C 7/04 345/8 |

* cited by examiner

*Primary Examiner* — Ian Jen
(74) *Attorney, Agent, or Firm* — Christopher G. Darrow; Darrow Mustafa PC

(57) ABSTRACT

A vehicle and anti-lock braking processes for the vehicle as automatically implemented by a computing device are disclosed. The vehicle can include a perception system and a computing device in communication with the perception system. The computing device can be configured to detect, using the perception system, an environmental condition external to the vehicle and select a wheel slip threshold based on the environmental condition. The environmental condition can be a weather-based condition or an obstacle-based condition. If the selected wheel slip threshold is reached while the vehicle is braking, the computing device can send a command to activate anti-lock braking for the vehicle.

20 Claims, 3 Drawing Sheets

ENVIRONMENT-BASED ANTI-LOCK BRAKING SYSTEM

BACKGROUND

Anti-lock braking systems (ABS) function as part of overall vehicle braking systems to prevent the vehicle's wheels from locking or excessively slipping while a driver brakes the vehicle, improving both brake feel and driver control of the vehicle. Anti-lock braking can be automatically initiated by an ABS controller once the wheel speed in at least one wheel of the vehicle drops a predetermined amount in comparison to vehicle speed over a predetermined time period, that is, when a wheel slip threshold is reached. However, a single wheel slip threshold is not sufficient to account for different environmental conditions that can occur during some instances of vehicle braking, such as environmental conditions including rain, snow, sleet, potholes, and speed bumps.

SUMMARY

Anti-lock braking methods and systems for a vehicle are described below. The vehicle can include a computing device running an ABS controller program that is configured to select a wheel slip threshold for implementing anti-lock braking based on environmental conditions external to the vehicle. Example environmental conditions can include both weather-based conditions, such as rain, snow, and ice, and obstacle-based conditions, such as speed bumps and potholes. The wheel slip threshold associated with obstacle-based conditions can be greater, that is, less sensitive, than the wheel slip threshold associated with weather-based conditions. The use of an environmental condition-based wheel slip threshold allows for better brake feel and driver comfort during anti-lock braking.

In one implementation, a method of braking a vehicle is disclosed. The method includes detecting, using a perception system, an environmental condition external to the vehicle. The method further includes selecting a wheel slip threshold based on the environmental condition. If the wheel slip threshold is reached while the vehicle is braking, the method further includes sending a command to activate anti-lock braking.

In another implementation, a computing device is disclosed. The computing device includes one or more processors for controlling operations of the computing device and a memory for storing data and program instructions used by the one or more processors. The one or more processors are configured to execute instructions stored in the memory to: detect, using a perception system, an environmental condition external to a vehicle; select a wheel slip threshold based on the environmental condition; and if the wheel slip threshold is reached while the vehicle is braking, send a command to activate anti-lock braking.

In another implementation, a vehicle is disclosed. The vehicle includes a perception system and a computing device in communication with the perception system. The computing device includes one or more processors for controlling operations of the computing device and a memory for storing data and program instructions used by the one or more processors. The one or more processors are configured to execute instructions stored in the memory to: detect, using the perception system, an environmental condition external to the vehicle; select a wheel slip threshold based on the environmental condition; and if the wheel slip threshold is reached while the vehicle is braking, send a command to activate anti-lock braking.

BRIEF DESCRIPTION OF THE DRAWINGS

The description herein makes reference to the accompanying drawings wherein like reference numerals refer to like parts throughout the several views, and wherein.

DETAILED DESCRIPTION

An improved ABS system and computing device for implementing the ABS system on a vehicle are disclosed. The vehicle can include a perception system for capturing information related to environmental conditions, such as weather-based conditions or obstacle-based conditions, along the travel path of the vehicle. Based on the type of environmental condition detected, the computing device can select a wheel slip threshold for ABS activation, that is, an amount of wheel slip required before anti-lock braking is activated. By tying the wheel slip threshold to external road conditions, the computing device can either increase or decrease the sensitivity of the ABS system based on the type of condition encountered. A tailored response of the ABS system can provide an improved brake feel to the driver.

Figure 1:
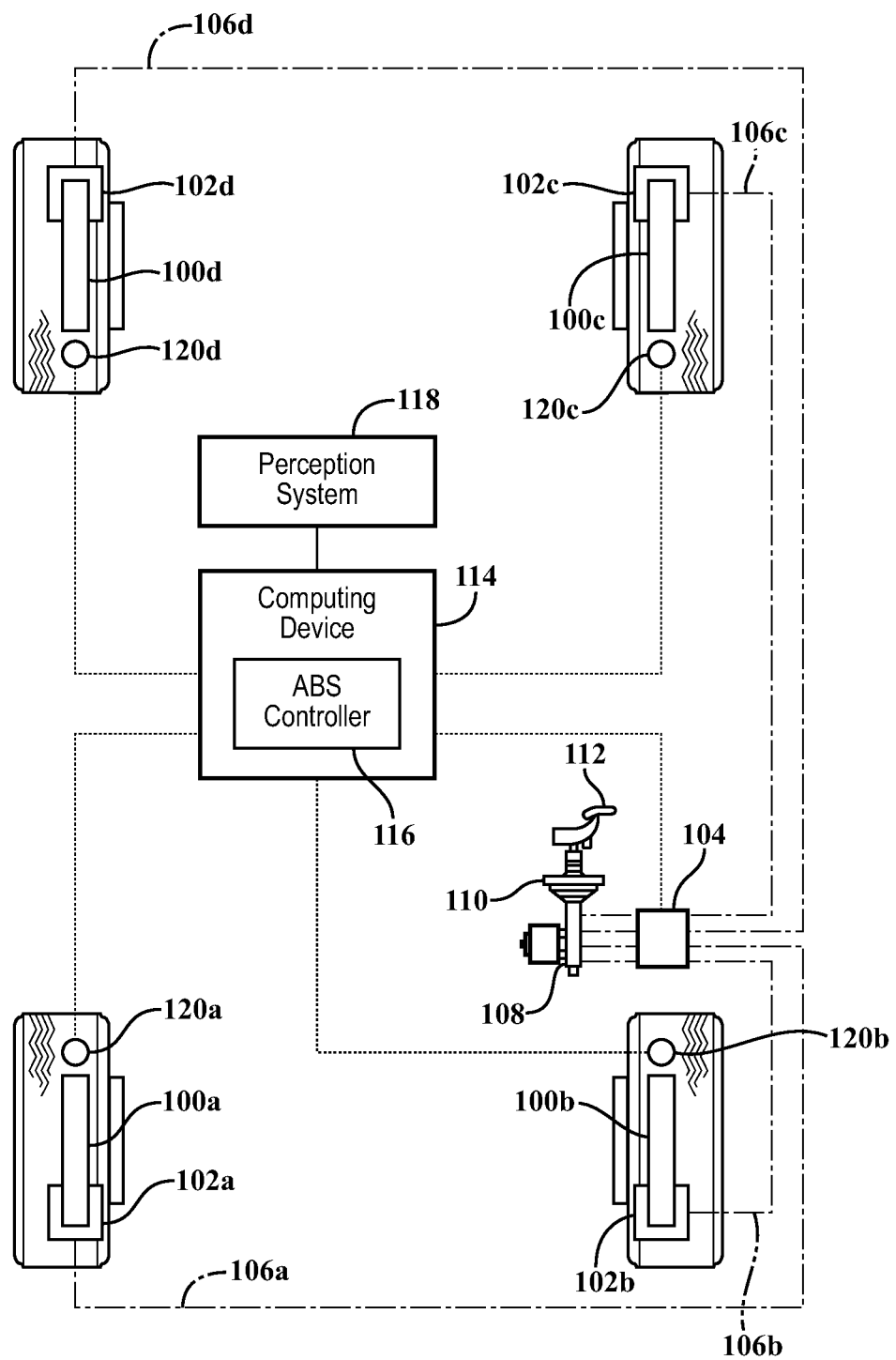
FIG. 1 is a schematic diagram of a vehicle braking system configured to implement an environment-based anti-lock braking process.

FIG. 1 is a schematic diagram of a vehicle braking system configured to implement an environment-based anti-lock braking process. In this example, the braking system includes four brake discs 100a-d and four brake calipers 102a-d, with each of the brake calipers 102a-d connected to a hydraulic modulation unit 104 by hydraulic brake lines 106a-d. The hydraulic modulation unit 104 is in fluid communication with a master cylinder 108 connected to a brake booster 110 and brake pedal 112. Under normal brake operation, the brake pedal 112 is operated by the driver of the vehicle to apply braking pressure using the brake calipers 102a-d to the brake discs 100a-d. The hydraulic modulation unit 104 can also be in communication with a computing device 114, for example, in the form of an electronic control unit (ECU), configured to send commands to the hydraulic modulation unit 104 to electronically apply braking pressure.

The computing device 114 can be any type of vehicle-installed or other form of single computing device, or can be composed of multiple computing devices. The processing unit in the computing device can be a conventional central processing unit (CPU) or any other type of device, or multiple devices, capable of manipulating or processing information. The memory in the computing device can be a random access memory device (RAM) or any other suitable type of storage device. The memory can include data that is accessed by the CPU using a bus.

The memory can also include an operating system and installed applications, the installed applications including an ABS controller 116 that permits the CPU to implement the environment-based anti-lock braking process as described below. The computing device 114 can also include secondary, additional, or external storage, for example, a memory card, flash drive, or any other form of computer readable medium. In one embodiment, the installed applications including the ABS controller 116 can be stored in whole or in part in the external storage and loaded into the memory as needed for processing.

The computing device 114 can also be in communication with a perception system 118. The perception system 118 can be configured to capture data and/or signals for an image-based system, a light detection and ranging (LIDAR) system, or any other type of system capable of capturing information specific to the environment surrounding a vehicle. In the examples described below, the perception system 118 can be configured to capture, at least, images for an image-based sensor system so that the computing device 114 can detect the presence of various environmental conditions surrounding the vehicle, including weather conditions and obstacle-based conditions, for use by the ABS controller 116 in implementing the environment-based anti-lock braking process.

The computing device 114 can also be in communication with one or more vehicle sensors, such as wheel speed sensors 120a-d. The ABS controller 116 can be configured to receive wheel speed information from the wheel speed sensors 120a-d for comparison to vehicle speed in order to determine the amount of wheel slip at a given wheel, that is, the decrease in speed of a wheel in comparison to overall vehicle speed leading to potential loss of traction at that wheel. Wheel slip values can be used by the ABS controller 116 to determine when modulation of braking pressure should occur, as implemented by the hydraulic modulation unit 104, in order to prevent wheel lockup and improve the driver's control of the vehicle while braking.

Figure 2A:
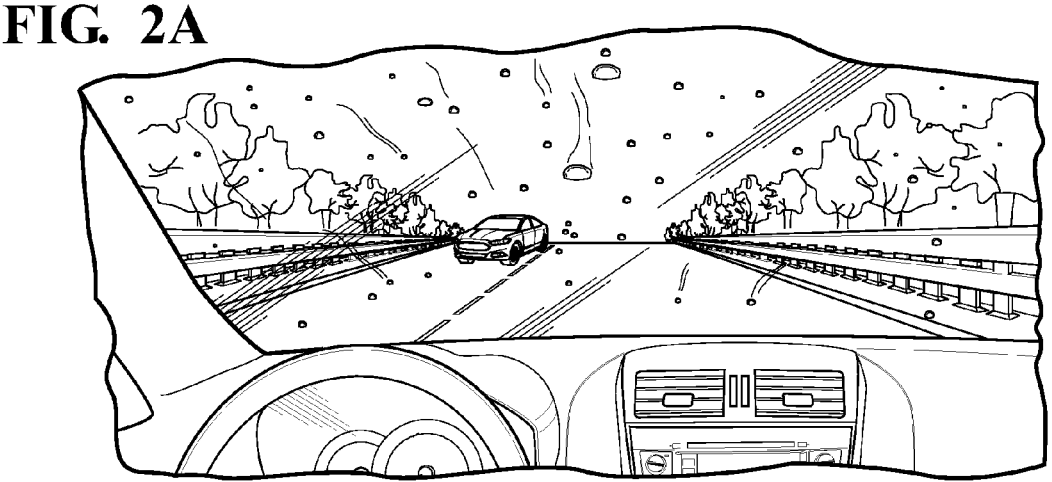
FIGS. 2A-2C show exemplary images of environmental conditions captured external to a vehicle including the vehicle braking system of FIG. 1.
Figure 2B:
Figure 2C:
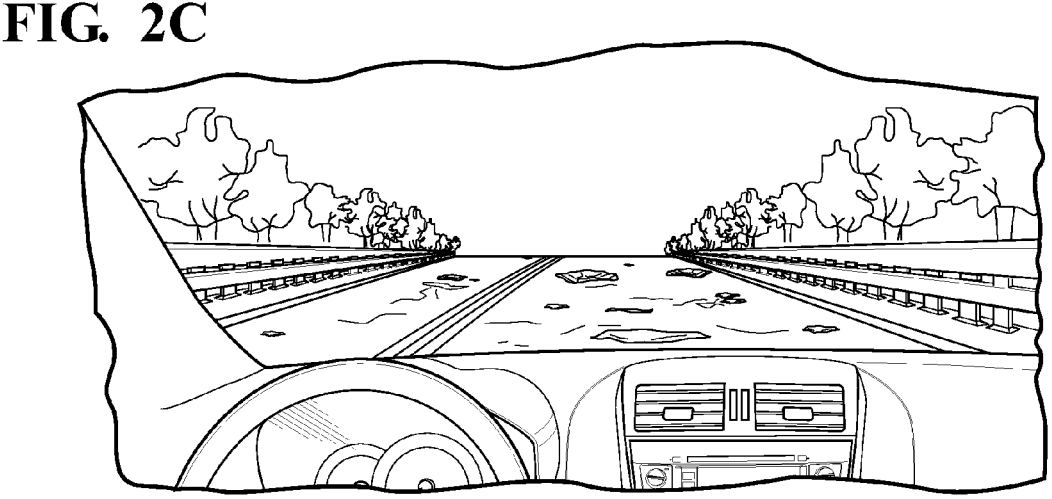

FIGS. 2A-2C show exemplary images of environmental conditions captured external to a vehicle including the vehicle braking system of FIG. 1. Each of the images is captured from the vantage point of the driver, though other vantage points are also possible. FIG. 2A shows a weather-based environmental condition of rain as evidenced by the water droplets present within the image captured. Alternatively, a rain sensor can provide information to the ABS controller 116 regarding a rainy condition. FIG. 2B shows a weather-based environmental condition of snow as evidenced by the waved hillocks of accumulation at the sides of the road and the obscuration of the road surface present within the image captured. FIG. 2C shows an obstacle-based environmental condition of potholes on the road within another image captured from the vantage point of the driver.

The examples of rain, snow, and potholes are only a few of the possible environmental conditions that can be detected by the perception system 118. Other weather-based environmental conditions affecting the performance of the braking system can include hail, sleet, or ice present on the road. Other obstacle-based environmental conditions can include speed bumps, rough terrain, such as a dirt road or rocky path, or debris present within the road, such as pieces of tire rubber sloughed from a truck tire on a highway. These environmental conditions can adversely impact the performance of the braking system and cause varying degrees of wheel slip. A standard ABS system could be configured to engage anti-lock braking at a standard value of wheel slip for all of these environmental conditions, and depending on the environmental condition, the driver could thus experience poor brake feel or be subjected to a jarring ride based on the anti-lock braking response. An improved anti-lock braking process that accounts for environmental conditions such as those in FIGS. 2A-2C is described below.

Figure 3:
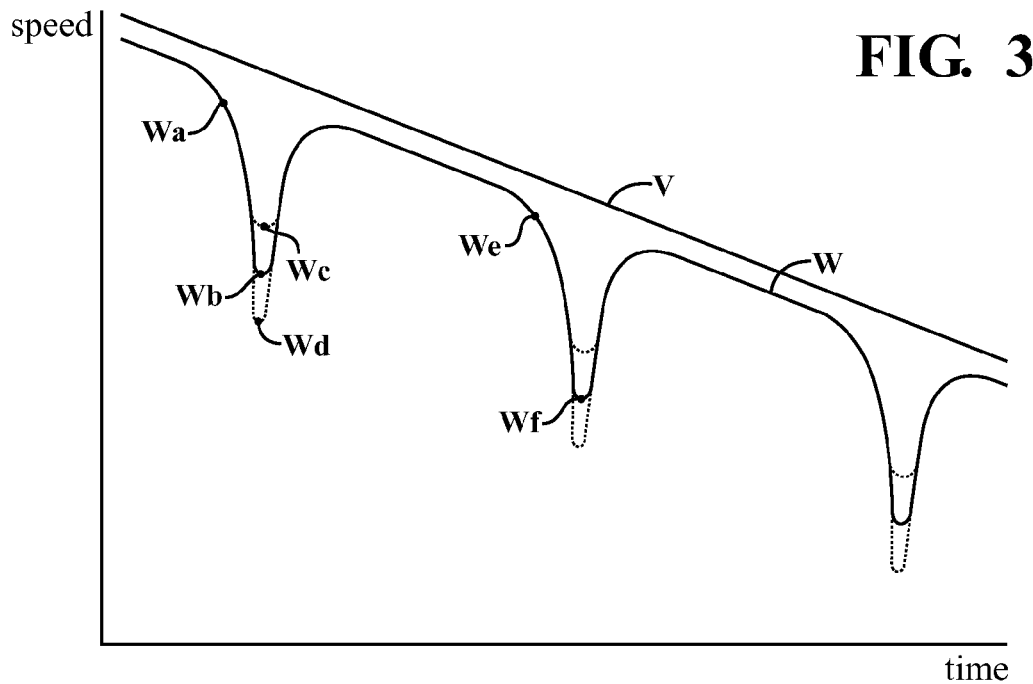
FIG. 3 is a graphical representation of vehicle speed and wheel speed during anti-lock braking implemented using the vehicle braking system of FIG. 1.

FIG. 3 is a graphical representation of vehicle speed and wheel speed during anti-lock braking implemented using the vehicle braking system of FIG. 1. In this example, vehicle speed is shown using vehicle speed curve V and wheel speed for a single wheel is shown using wheel speed curve W, though it is understood that the anti-lock braking process can be applied at all four wheels on the vehicle. When the vehicle is being decelerated during braking, for example, when a driver depresses the brake pedal 112, the vehicle's speed can decrease in a generally linear manner over time as shown by the vehicle speed curve V. At the same time, the wheel speed will decrease in a generally linear manner unless an external condition, such as rain, snow, ice, rugged terrain, etc., causes the wheel to slip, or lose traction, at which point the wheel speed will decrease rapidly, for example, from wheel speed Wa to wheel speed Wb indicated along the wheel speed curve W as a fixed amount of wheel slip.

A predetermined difference between wheel speeds, e.g. Wa-Wb, experienced during wheel slip can be set as a baseline wheel slip threshold for anti-lock braking to be implemented. That is, if the wheel speed drops at least the baseline amount, the ABS controller 116 can be configured to send a command to the hydraulic modulation unit 104 to implement anti-lock braking automatically, and the affected wheel will avoid locking and regain traction, returning the wheel speed of the affected wheel to the generally linear wheel speed curve W until the next drop in wheel speed surpassing the wheel slip threshold is experienced, and the process repeats. The wheel slip threshold in this example, Wa-Wb, appearing on the left hand side of the wheel speed curve W, is suitable for some external conditions, but not others.

In an environmental condition-based anti-lock braking process, the ABS controller 116 can be configured to select a wheel slip threshold based on environmental conditions external to the vehicle. For example, if the perception system 118 identifies rain, snow, sleet, ice, hail, or other weather-based conditions external to the vehicle, the ABS controller 116 can be configured to select a lower wheel slip threshold, such as Wa-Wc, to be reached before anti-lock braking is automatically implemented. That is, the sensitivity of the anti-lock braking system can be increased, and anti-lock braking will occur more quickly in conditions such as rain, snow, sleet, ice, or hail, improving traction of the vehicle.

In another example, if the perception system 118 identifies obstacle-based environmental conditions, such as speed bumps, rough terrain, or potholes, the ABS controller 116 can be configured to select a higher wheel slip threshold, such as Wa-Wd, to be reached before anti-lock braking is automatically implemented. That is, the sensitivity of the anti-lock braking system can be decreased, and more wheel slip will be required before anti-lock braking is implemented in conditions where the vehicle encounters potholes or speed bumps, again improving the traction of the vehicle and control retained by the driver.

In the above wheel slip examples, a fixed amount of wheel slip is the basis for passing the wheel slip threshold and implementing anti-lock braking. For example, the second drop in wheel speed on the wheel speed curve W shown in FIG. 3, i.e. the drop from wheel speed We to wheel speed Wf, is equivalent to the drop from wheel speed Wa to wheel speed Wd on the first drop in the wheel speed curve W for purposes of passing the wheel slip threshold. Additionally, though not shown here, the wheel slip threshold can be based on other vehicle parameters, such as vehicle speed, vehicle deceleration, and vehicle steering angle. For example, the wheel slip threshold sensitivity can be increased, that is, the drop in wheel speed can be set at a smaller wheel slip threshold value, if the vehicle is currently turning or if the vehicle is decelerating rapidly since turning maneuvers and rapid deceleration are more likely to cause wheel slip.

Figure 4:
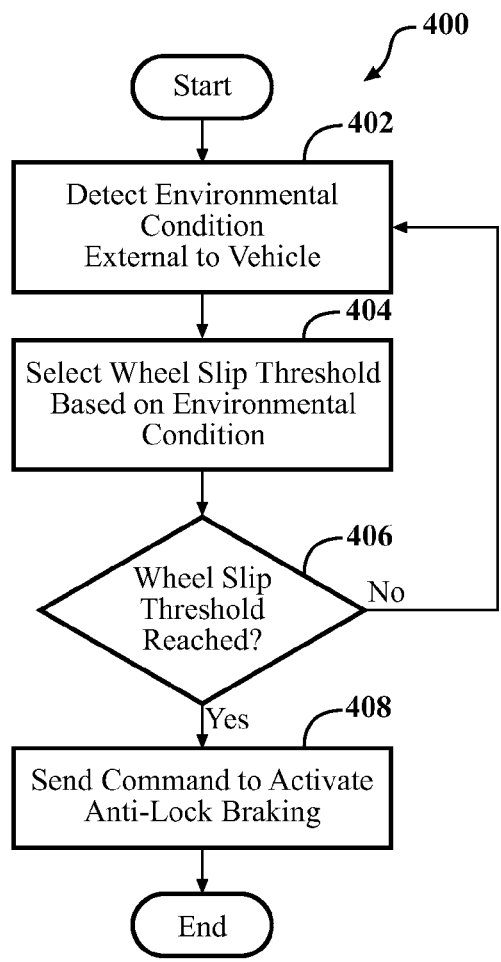
FIG. 4 is flowchart of an exemplary environment-based anti-lock braking process implemented using the vehicle braking system of FIG. 1.

FIG. 4 is flowchart of an exemplary environment-based anti-lock braking process 400 implemented using the vehicle braking system of FIG. 1. In step 402, the perception system 118 can be used to detect an environmental condition external to the vehicle. The environmental condition can be a weather-based condition, such as rain, snow, sleet, hail, or ice, or an obstacle-based condition, such as potholes, a speed bump, or rough terrain. Each of these environmental conditions can adversely impact the operation of the vehicle's braking system, including any anti-lock braking applied during wheel slip conditions. For example, rain, snow, or ice on the road can cause a vehicle's wheels to slip more easily than dry pavement. Potholes or speed bumps can also cause wheel slip, but traction is often regained easily by the vehicle without the use of anti-lock braking.

In step 404, the computing device 114 can select a wheel slip threshold for anti-lock braking based on a detected environmental condition. The wheel slip threshold selected can be a predetermined drop in velocity for one or more wheels of the vehicle. For example, a wheel slip threshold for use under a weather-based condition is shown in FIG. 3 as Wa-Wc. Similarly, a wheel slip threshold for use under an obstacle-based condition is shown in FIG. 3 as Wa-Wd. In this example, the braking system sensitivity for implementing anti-lock braking is increased from a baseline value (e.g. Wa-Wb) for weather-based conditions and decreased from the baseline value for obstacle-based conditions. The wheel slip thresholds described in these examples are chosen to improve anti-lock braking performance and overall braking performance of the vehicle.

The wheel slip threshold selected can also be based on other parameters than a rapid drop in wheel speed, such as vehicle speed, vehicle deceleration, and vehicle steering angle. Anti-lock braking sensitivity can be increased, for example, if the vehicle is decelerating quickly or if the vehicle is driving at a high speed while turning. Alternatively, anti-lock braking sensitivity can be decreased, for example, if the vehicle is decelerating slowly while driving at a low speed and driving relatively straight along the road.

In decision block 406, the computing device 114 determines whether the selected wheel slip threshold is reached while the vehicle is braking. If the selected wheel slip threshold is not reached, the process 400 returns to step 402, and the perception system 118 again detects environmental conditions external to the vehicle. If the selected wheel slip threshold is reached, the process 400 continues to step 408, and the computing device 114, using the ABS controller 116, sends a command to the hydraulic modulation unit 104 to activate anti-lock braking. After step 408, the process ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle is generally described an automobile. However, the vehicle is not limited to an automobile, as the driver interface can also be implemented with other vehicles that are generally controlled by a driver, or operator, such as boats, construction vehicles, etc. The scope of the claims is thus to be accorded the broadest interpretation so as to encompass all such modifications and equivalent structures.

What is claimed is:

1. A method of braking a vehicle, comprising:
   detecting, using a perception system, an environmental condition external to the vehicle;
   selecting a wheel slip threshold based on the environmental condition; and
   if the wheel slip threshold is reached while the vehicle is braking, sending a command to activate anti-lock braking.

2. The method of claim 1, wherein the environmental condition is one of a weather-based condition and an obstacle-based condition.

3. The method of claim 2, wherein the weather-based condition is at least one of rain and snow and hail and sleet and ice.

4. The method of claim 2, wherein the obstacle-based condition is at least one of a pothole and a speed bump and rough terrain.

5. The method of claim 2, wherein the wheel slip threshold for an obstacle-based condition is larger than the wheel slip threshold for a weather-based condition.

6. The method of claim 1, wherein the wheel slip threshold is a predetermined drop in velocity for one or more wheels of the vehicle.

7. The method of claim 1, wherein the wheel slip threshold is further based on at least one of vehicle speed and vehicle deceleration and vehicle steering angle.

8. A computing device, comprising:
   one or more processors for controlling operations of the computing device; and
   a memory for storing data and program instructions used by the one or more processors, wherein the one or more processors are configured to execute instructions stored in the memory to:
      detect, using a perception system, an environmental condition external to a vehicle;
      select a wheel slip threshold based on the environmental condition; and
      if the wheel slip threshold is reached while the vehicle is braking, send a command to activate anti-lock braking.

9. The computing device of claim 8, wherein the environmental condition is one of a weather-based condition and an obstacle-based condition.

10. The computing device of claim 9, wherein the weather-based condition is at least one of rain and snow and hail and sleet and ice.

11. The computing device of claim 9, wherein the obstacle-based condition is at least one of a pothole and a speed bump and rough terrain.

12. The computing device of claim 9, wherein the wheel slip threshold for an obstacle-based condition is larger than the wheel slip threshold for a weather-based condition.

13. The computing device of claim 8, wherein the wheel slip threshold is a predetermined drop in velocity for one or more wheels of the vehicle.

14. The computing device of claim 8, wherein the wheel slip threshold is further based on at least one of vehicle speed and vehicle deceleration and vehicle steering angle.

15. A vehicle, comprising:
   a perception system disposed on the vehicle; and
   a computing device in communication with the perception system, comprising:
      one or more processors for controlling operations of the computing device; and a memory for storing data and program instructions used by the one or more processors, wherein the one or more processors are configured to execute instructions stored in the memory to:

detect, using the perception system, an environmental condition external to the vehicle;

select a wheel slip threshold based on the environmental condition; and if the wheel slip threshold is reached while the vehicle is braking, send a command to activate anti-lock braking.

16. The vehicle of claim 15, wherein the environmental condition is one of a weather-based condition and an obstacle-based condition.

17. The vehicle of claim 16, wherein the weather-based condition is at least one of rain and snow and hail and sleet and ice.

18. The vehicle of claim 16, wherein the obstacle-based condition is at least one of a pothole and a speed bump and rough terrain.

19. The vehicle of claim 16, wherein the wheel slip threshold for an obstacle-based condition is larger than the wheel slip threshold for a weather-based condition.

20. The vehicle of claim 15, wherein the wheel slip threshold is further based on at least one of vehicle speed and vehicle deceleration and vehicle steering angle.

* * * * *